US012310298B2

(12) United States Patent
Dudik et al.

(10) Patent No.: US 12,310,298 B2
(45) Date of Patent: May 27, 2025

(54) ALIGNMENT GUIDE FOR AN ALIGNMENT SYSTEM OF A MOBILE IRRIGATION SYSTEM

(71) Applicant: Lindsay Corporation, Omaha, NE (US)

(72) Inventors: Matthew John Dudik, Elkhorn, NE (US); Michael Charles South, Council Bluffs, IA (US); Troy Hanson, Blair, NE (US)

(73) Assignee: LINDSAY CORPORATION, Omaha, NE (US)

( * ) Notice: Subject to any disclaimer, the term of this patent is extended or adjusted under 35 U.S.C. 154(b) by 447 days.

(21) Appl. No.: 17/591,941

(22) Filed: Feb. 3, 2022

(65) Prior Publication Data

US 2023/0243443 A1 Aug. 3, 2023

(51) Int. Cl.
*A01G 25/09* (2006.01)
*A01G 25/16* (2006.01)
*F16L 3/00* (2006.01)

(52) U.S. Cl.
CPC .......... *A01G 25/092* (2013.01); *A01G 25/16* (2013.01); *F16L 3/00* (2013.01)

(58) Field of Classification Search
CPC .......... A01G 25/092; A01G 25/16; F16L 3/00
USPC ................................. 239/728, 731
See application file for complete search history.

(56) References Cited

U.S. PATENT DOCUMENTS

| | | | |
|---|---|---|---|
| 3,738,687 A * | 6/1973 | Zimmerer | F16L 27/0849 285/373 |
| 3,952,769 A * | 4/1976 | Ott | A01G 25/092 239/731 |
| 4,041,975 A | 8/1977 | Ames | |
| 4,073,309 A | 2/1978 | Fraser et al. | |
| 4,142,547 A | 3/1979 | Courtright | |
| 4,161,185 A * | 7/1979 | McConnell | A01G 25/092 239/731 |
| 9,066,475 B1 | 6/2015 | Toman | |

(Continued)

FOREIGN PATENT DOCUMENTS

| | | |
|---|---|---|
| CN | 1345531 | 4/2002 |
| CN | 103782875 | 5/2014 |

OTHER PUBLICATIONS

International Search Report and Written Opinion mailed May 15, 2023 in related PCT Application No. PCT/US2023/061217, 11 pages.

*Primary Examiner* — Jason J Boeckmann
(74) *Attorney, Agent, or Firm* — HOVEY WILLIAMS LLP

(57) ABSTRACT

A mobile irrigation alignment system comprising a base mounted on a first span, a linkage system, and a control box. The linkage system includes a driven arm, drive arm, and control arm. The driven arm is pivotably connected to the base about a vertical axis. The drive arm is pivotably connected to the driven arm about a horizontal axis and includes a distal end configured to rest on an adjacent span. The control arm is linked to the driven arm. The control box determines lateral alignment between the spans based on the control arm as governed by the drive arm and driven arm. The drive arm is configured to retain an upright orientation relative to the driven arm regardless of torsional rotation between the spans so that the position of the control arm and hence the lateral alignment determination is not affected by the torsional rotation between the spans.

22 Claims, 9 Drawing Sheets

(56) References Cited

U.S. PATENT DOCUMENTS

| | | |
|---|---|---|
| 9,538,712 B2 | 1/2017 | Korus |
| 10,342,186 B2 | 7/2019 | Betzen |
| 10,582,671 B2 | 3/2020 | Abts et al. |
| 10,905,056 B2 | 2/2021 | Dudik et al. |
| 2002/0107582 A1 | 8/2002 | Pollak et al. |

* cited by examiner

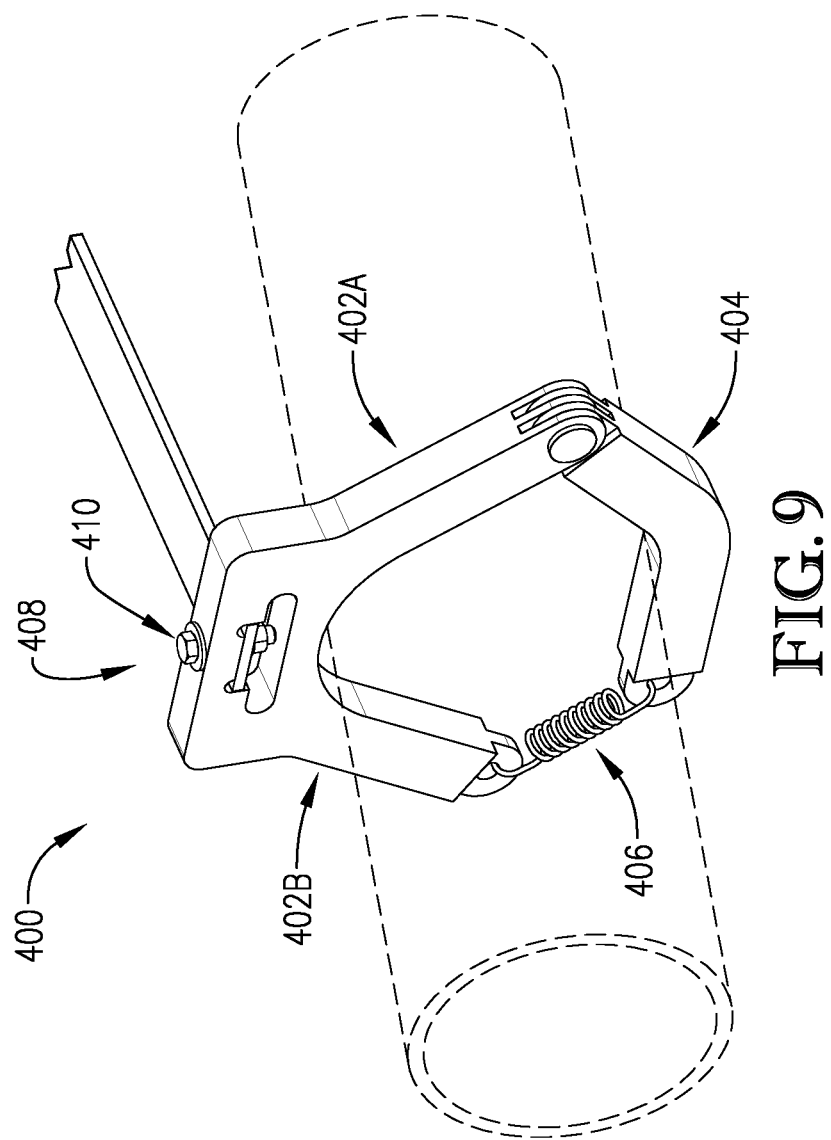

ALIGNMENT GUIDE FOR AN ALIGNMENT SYSTEM OF A MOBILE IRRIGATION SYSTEM

BACKGROUND

Mobile irrigation systems often include alignment systems for monitoring and maintaining lateral alignment between adjacent spans as they advance across a field. Many span joints also have some amount of vertical and torsional freedom to accommodate uneven terrain. Vertical movement and torsional rotation between adjacent spans may cause false or inaccurate misalignment signals or otherwise affect lateral alignment measurements due to physical limitations of the alignment systems. This may result in poor alignment or inefficient operation as the alignment systems needlessly activate drive motors to correct false or inaccurate lateral misalignment.

SUMMARY

Embodiments of the invention solve the above-mentioned problems and other problems and provide a distinct advance in the art of alignment systems for mobile irrigation systems. More particularly, the invention provides a mobile irrigation system with an improved alignment system that reduces false or inaccurate misalignment determinations.

An embodiment of the invention is a mobile irrigation system broadly comprising a central pivot, a number of spans, and a number of alignment systems that accommodate movement between adjacent spans in three degrees of freedom while tracking movement in one of the three degrees of freedom without being adversely affected by movement in the other two degrees of freedom.

The central pivot distributes water or other fluids to the spans and may be a tower, a standpipe, or the like. The central pivot has access to a well, water tank, or other source of water and may also be coupled with a tank or other source of agricultural products to inject fertilizers, pesticides, and/or other chemicals into the water for application during irrigation.

Each span includes a truss section, a conduit section, a mobile tower, and a joint. The spans are pivotably connected end-to-end from the central pivot.

Each truss section includes a number of beams rigidly connected to one another to form a framework which carries or otherwise supports the conduit and other fluid distribution mechanisms that are connected in fluid communication to the conduit.

The conduit sections transport water or other fluids to sprinklers, spray guns, drop nozzles, or other fluid emitting devices spaced along the conduit sections to apply water and/or other fluids to areas underneath the irrigation system. The conduit sections may be or may include metal pipes and flexible liners including outlets to which the fluid emitting devices are connected.

The mobile towers are positioned at outward ends of the spans and each includes wheels and a drive motor. The drive motor may be an electric motor, such as an alternating current (AC) motor or a direct current (DC) motor, and may one of the wheels directly or through a drive shaft in order to propel the mobile towers forward or backward. Each mobile tower may also include a controller for activating the drive motor according to a position of the mobile tower or a relative angle of the adjacent span.

The joints connect the spans so that the spans are free to move relative to each other. The joints allow three degrees of freedom between adjacent spans: lateral (horizontal) pivoting, vertical pivoting, and torsional rotation.

The alignment systems are substantially identical so only a first alignment system will be described. The first alignment system broadly comprises a linkage system and a control system. The first alignment system determines and dictates lateral alignment between the first and second spans.

The linkage system converts relative alignment between the first and second spans into an input to electromechanical components of the control system and broadly comprises a driven arm, a drive arm, a control arm, a control arm adjuster, and a biasing element.

The driven arm is pivotably connected to the first span at a first pivot point and to the control arm via the control arm adjuster. The driven arm also includes a second pivot point to which the drive arm is pivotably connected. Furthermore, the driven arm is linked to the biasing element for reducing hysteresis in the linkage system and hence improving accuracy of alignment measurements.

The drive arm is pivotably connected to the driven arm at the second pivot point so that the drive arm can pivot relative to the driven arm about a horizontal axis. The drive arm also includes a longitudinal section having a distal end and an alignment guide near the distal end.

The alignment guide retains the distal end of the drive arm on the second span without the drive arm being fixed to the second span. In one embodiment, the alignment guide has an inverted U-shape and includes left and right downwardly-extending posts configured to engage the second span.

The control arm is connected to the driven arm via the control arm adjuster and connected to (or configured to engage) electromechanical components of the control system. In one embodiment, the control arm is pivotably connected to the driven arm via the control arm adjuster.

The control arm adjuster includes nuts, cams, or other components for setting the control arm's range of motion. This allows the alignment system to be calibrated and also accommodates different sizes and configurations of brackets in the base, linkage components in the linkage system, electromechanical components of the control system, and truss components and conduit components in the first and second spans.

The biasing element connects between the driven arm of the linkage system and a biasing element bracket or other anchor point for reducing hysteresis in the linkage system and hence improving accuracy of alignment measurements. The biasing element may be a coil spring, a leaf spring, an elastic component, or any other suitable biasing element.

The control system may include electromechanical components and electronic components for determining lateral alignment between the first and second spans based on a position of the control arm as governed by the drive arm and the driven arm. For example, the control system may include a cam, a microswitch, and a processor or controller.

The above-described invention provides several advantages. For example, the first alignment system is configured to track only lateral pivoting between the first and second spans without detrimental effects from the torsional rotation or the vertical pivoting between the first and second spans. The alignment guide can be attached at one of a plurality of positions on the longitudinal section of the drive arm, which allows for adjusting sensitivity of the linkage system. The control arm can be adjusted relative to the drive arm for calibrating the alignment system and accommodating changes in the alignment system. The stop protects the control system from damage in the event of excessive lateral pivoting between the first and second spans. Furthermore, the alignment system can easily be adapted and retrofitted to virtually any mobile irrigation system.

Another embodiment of the invention is an alignment guide broadly comprising an upper bar, left and right flexures, and a lower bar. The alignment guide may be used in place of the alignment guide described above.

The upper bar is configured to extend laterally over a conduit and includes a linkage connection point and a slide bearing. The upper bar and left and right flexures form a monolithic structure.

The linkage connection point is configured to connect the alignment guide to a longitudinal section of a drive arm. To that end, the linkage connection point includes an adjuster for effectively changing a length of the longitudinal section of the drive arm and hence calibrating the alignment guide.

The slide bearing is a low friction surface configured to contact the conduit. The slide bearing may also be curved to complement the curved surface of the conduit.

The left and right flexures extend downward from opposite ends of the upper bar to bracket the conduit and may each include a slide bearing. The left and right flexures may be pre-loaded to bias the slide bearings against the conduit. The left and right flexures may be resilient aluminum strips.

The slide bearings contact areas configured to slideably contact the conduit. The slide bearings are monolithic with a remainder of the left and right flexures and upper bar.

The lower bar extends between distal ends of the left and right flexures and are secured to the left and right flexures via opposing fasteners. The lower bar is configured to retain the alignment guide on the conduit.

Another embodiment of the invention is an alignment guide broadly comprising an upper bar, left and right flexures, and a lower bar assembled via fasteners. The alignment guide may be used in place of the alignment guides described above.

The upper bar is configured to extend laterally over a conduit and may include a linkage connection point. The upper bar is connected to the left and right flexures via fasteners.

The linkage connection point is configured to connect the alignment guide to a longitudinal section of a drive arm. To that end, the linkage connection point includes an adjuster for effectively changing a length of the longitudinal section of the drive arm and hence calibrating the alignment guide.

The left and right flexures extend downward from opposite ends of the upper bar to bracket the conduit and may each include a slide bearing. The left and right flexures are connected to the upper bar and the lower bar via fasteners. The left and right flexures are pre-loaded to bias the slide bearings against the conduit.

The slide bearings are contact pads configured to slideably contact the conduit. The slide bearings are connected to the left and right flexures via fasteners.

The lower bar extends between distal ends of the left and right flexures and is secured to the left and right flexures via opposing fasteners. The lower bar is configured to retain the alignment guide on the conduit.

Another embodiment of the invention is an alignment guide broadly comprising left and right arms, a lower bar, and a biasing element. The alignment guide may be used in place of the alignment guides described above.

The left and right arms extend diagonally downward relative to each other in an inverted V for cradling a conduit from above the conduit. A linkage connection point may be present near an upper juncture of the left and right arms for connecting the alignment guide to a longitudinal section of a drive arm. To that point, the linkage connection point accommodates an adjuster for effectively changing a length of the longitudinal section of the drive arm and hence calibrating the alignment guide.

The lower bar is pivotably connected to one of the left and right arms and may be configured to extend at least partially under the conduit. To that end, the lower bar is curved or may have an angled portion.

The biasing element is configured to connect the lower bar to the opposite one of the left and right arms to which the lower bar is not pivotably connected. The biasing element ensures the left and right arms and lower bar effectively encircle the conduit and the left and right arms remain in cradling engagement with the conduit without creating a significant amount of friction therebetween. The biasing element may be a spring, elastic cord, or the like. The alignment guide can be disengaged from the conduit by removing or disconnecting the biasing element from at least one of the biasing element and the left or right arm to which it is attached.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 9 is a perspective view of an alignment guide constructed in accordance with another embodiment of the invention.

Figure 1:
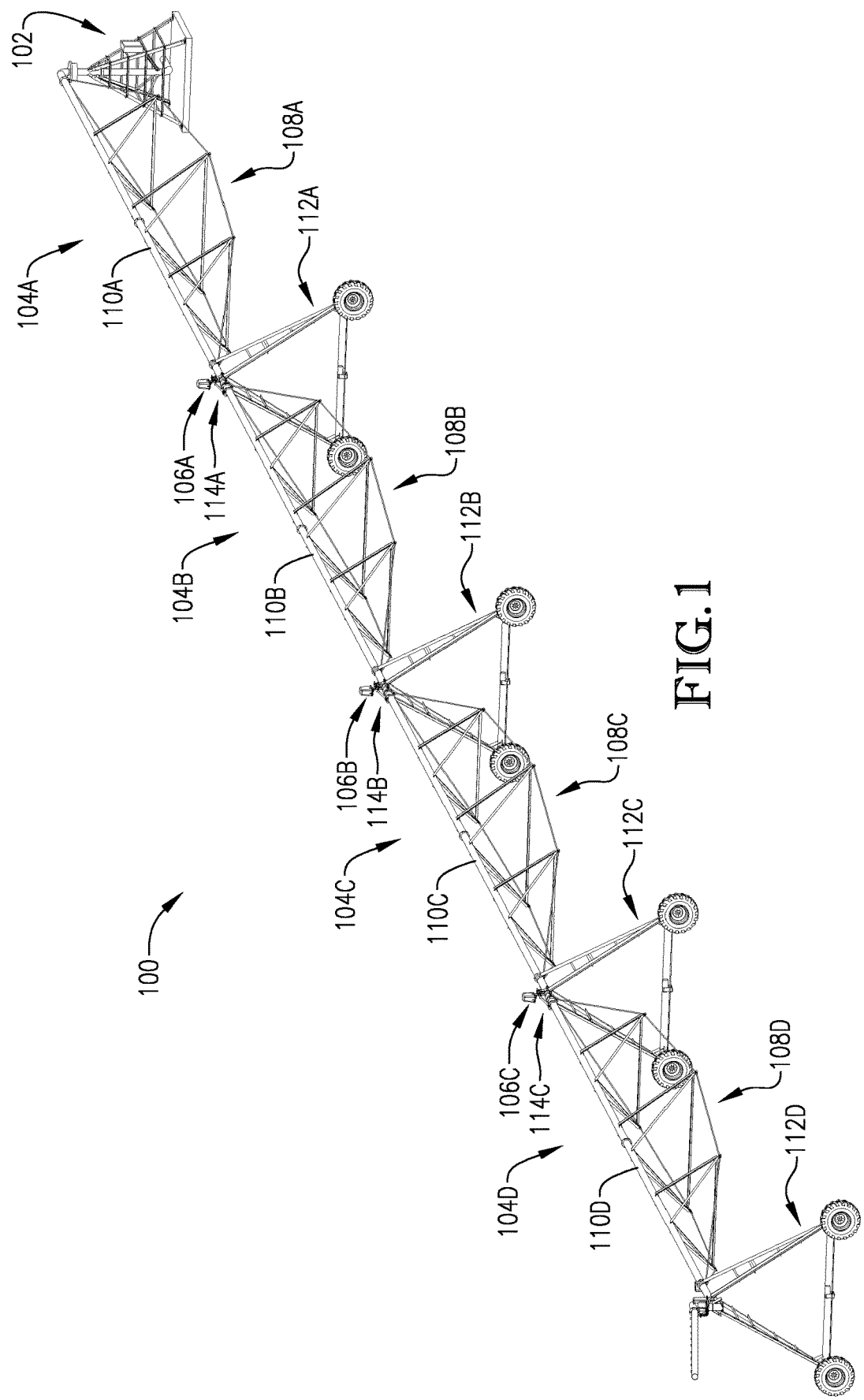
FIG. 1 is a perspective view of an irrigation system including a plurality of alignment systems constructed in accordance with an embodiment of the invention.
Figure 2:
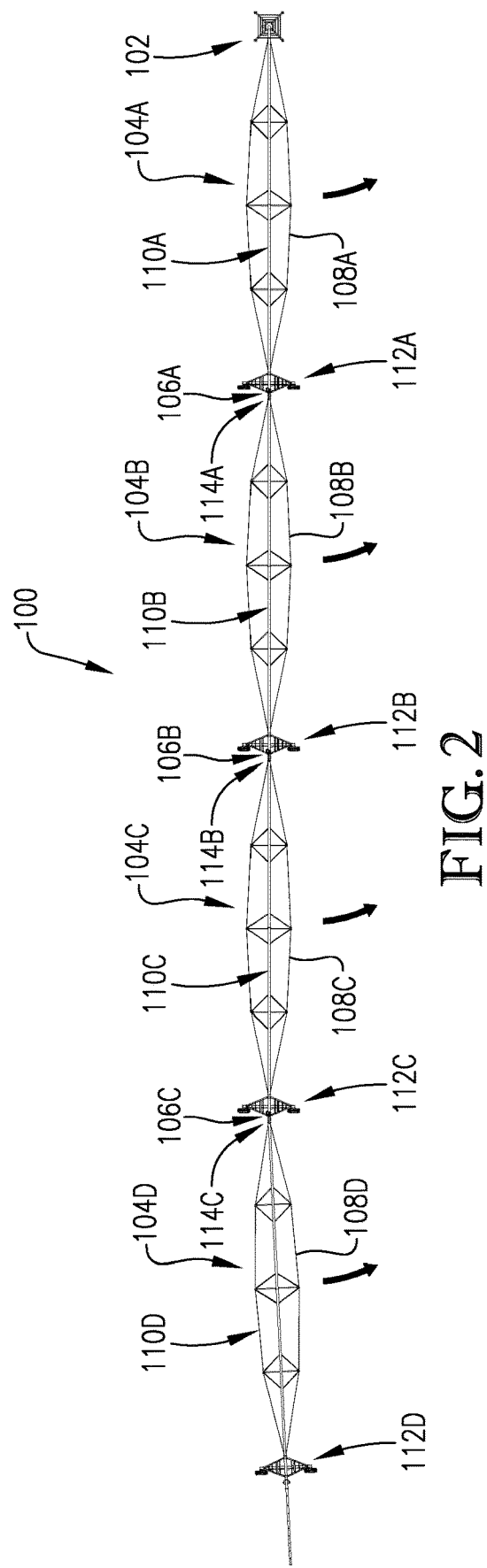
FIG. 2 is a plan view of the irrigation system of FIG. 1.
Figure 3:
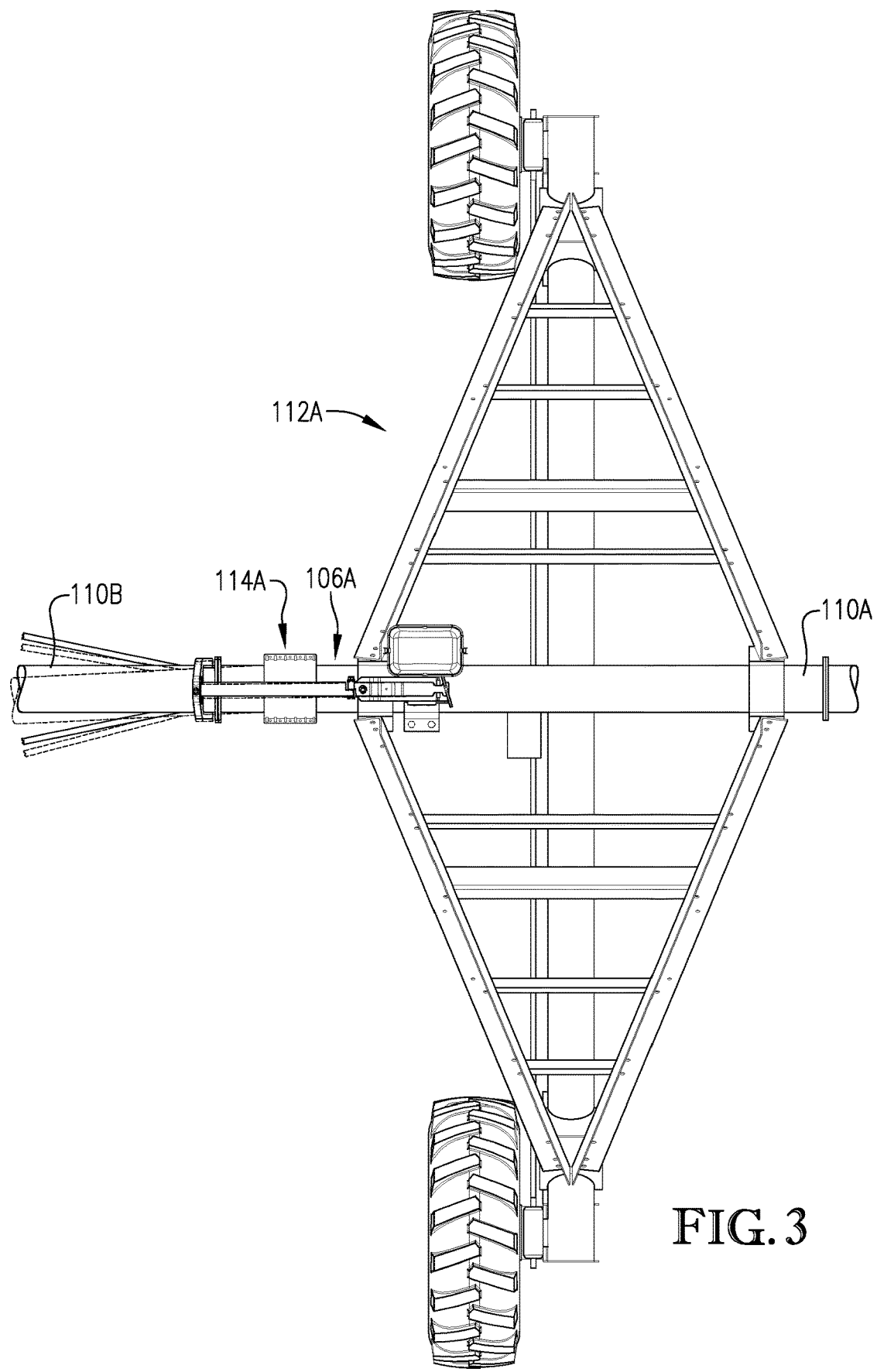
FIG. 3 is a plan view of an alignment system of the irrigation system of FIG. 1.
Figure 4:
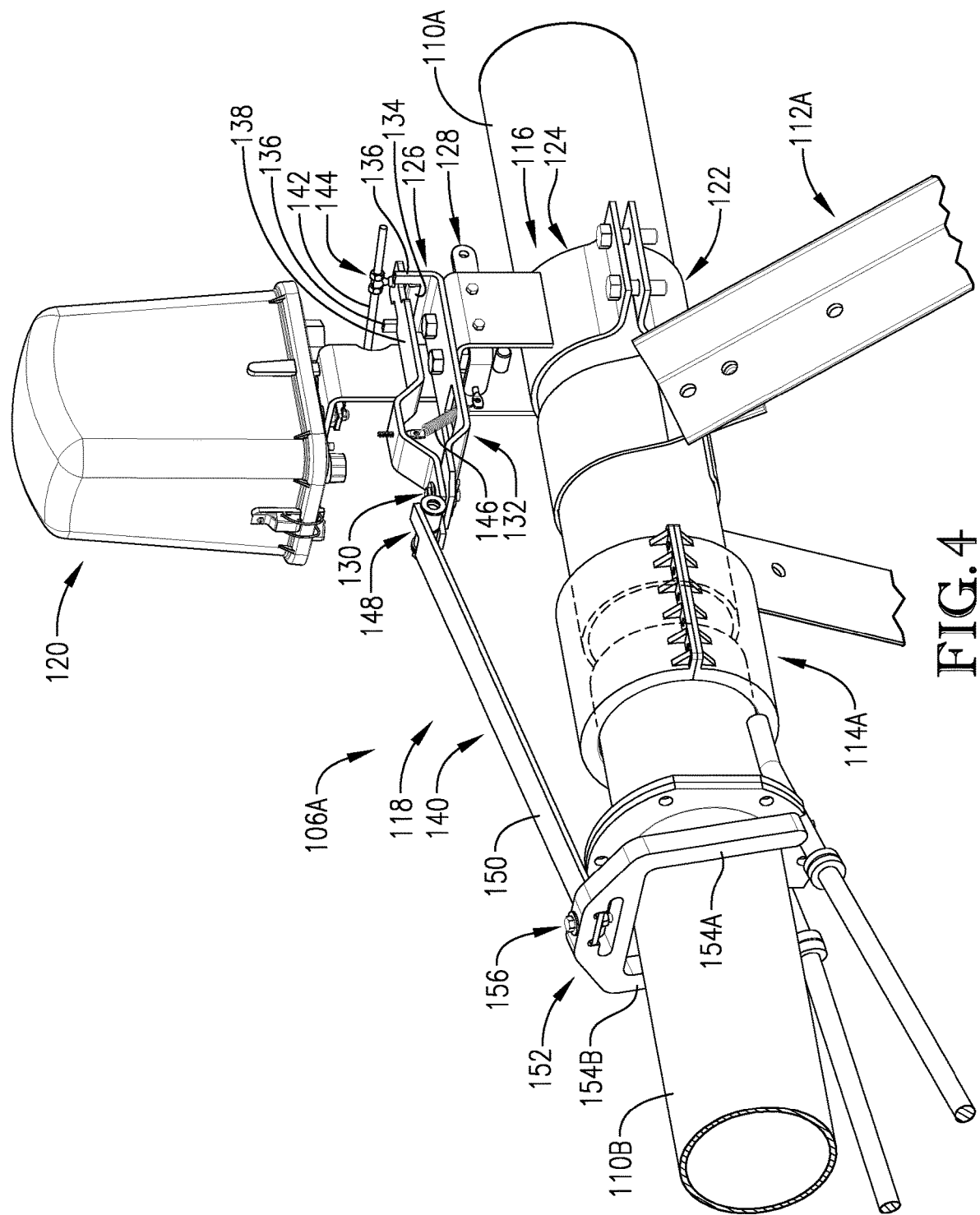
FIG. 4 is a perspective view of the alignment system of FIG. 3.
Figure 5:
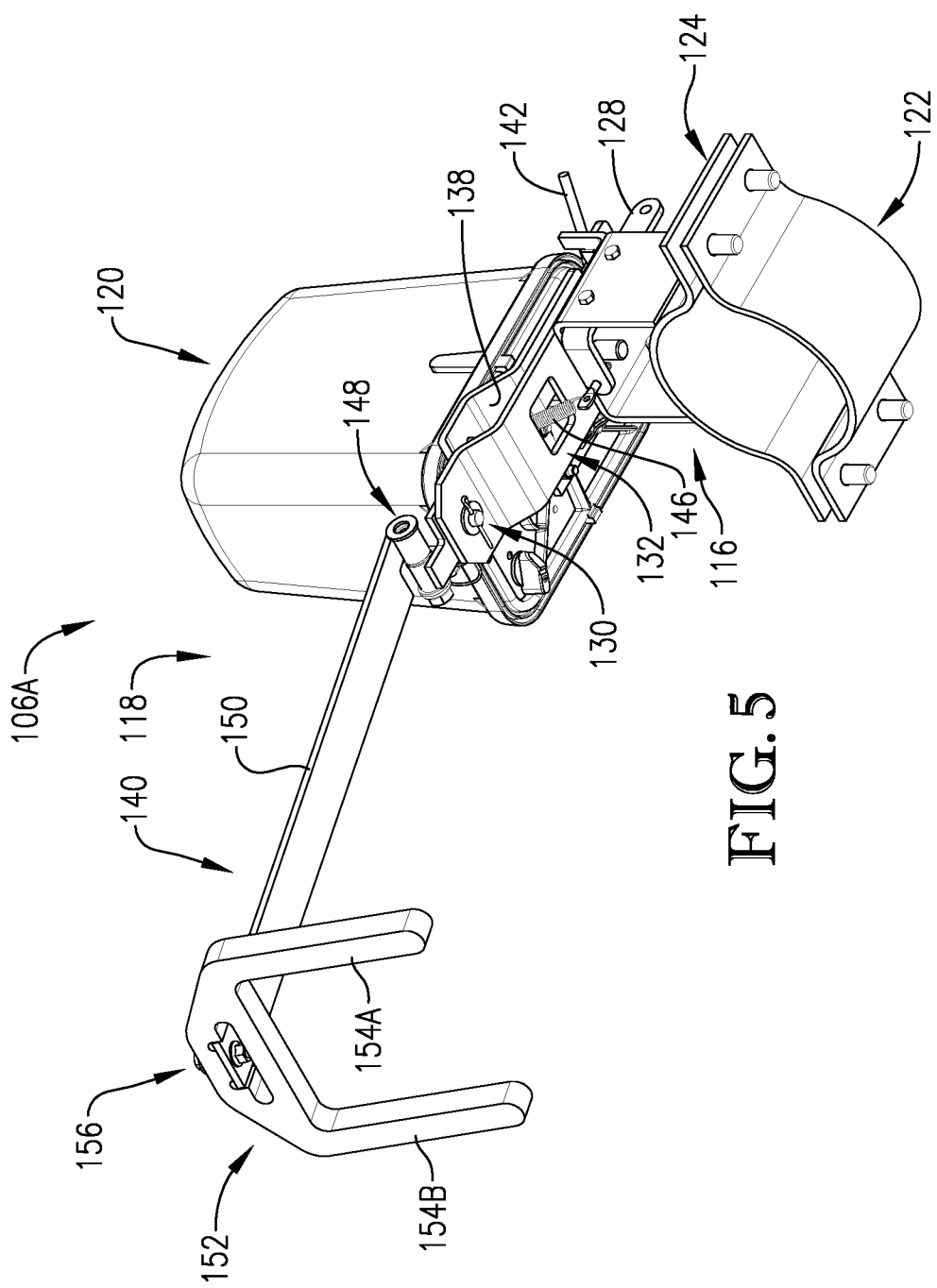
FIG. 5 is a bottom perspective view of the alignment system of FIG. 3.
Figure 6:
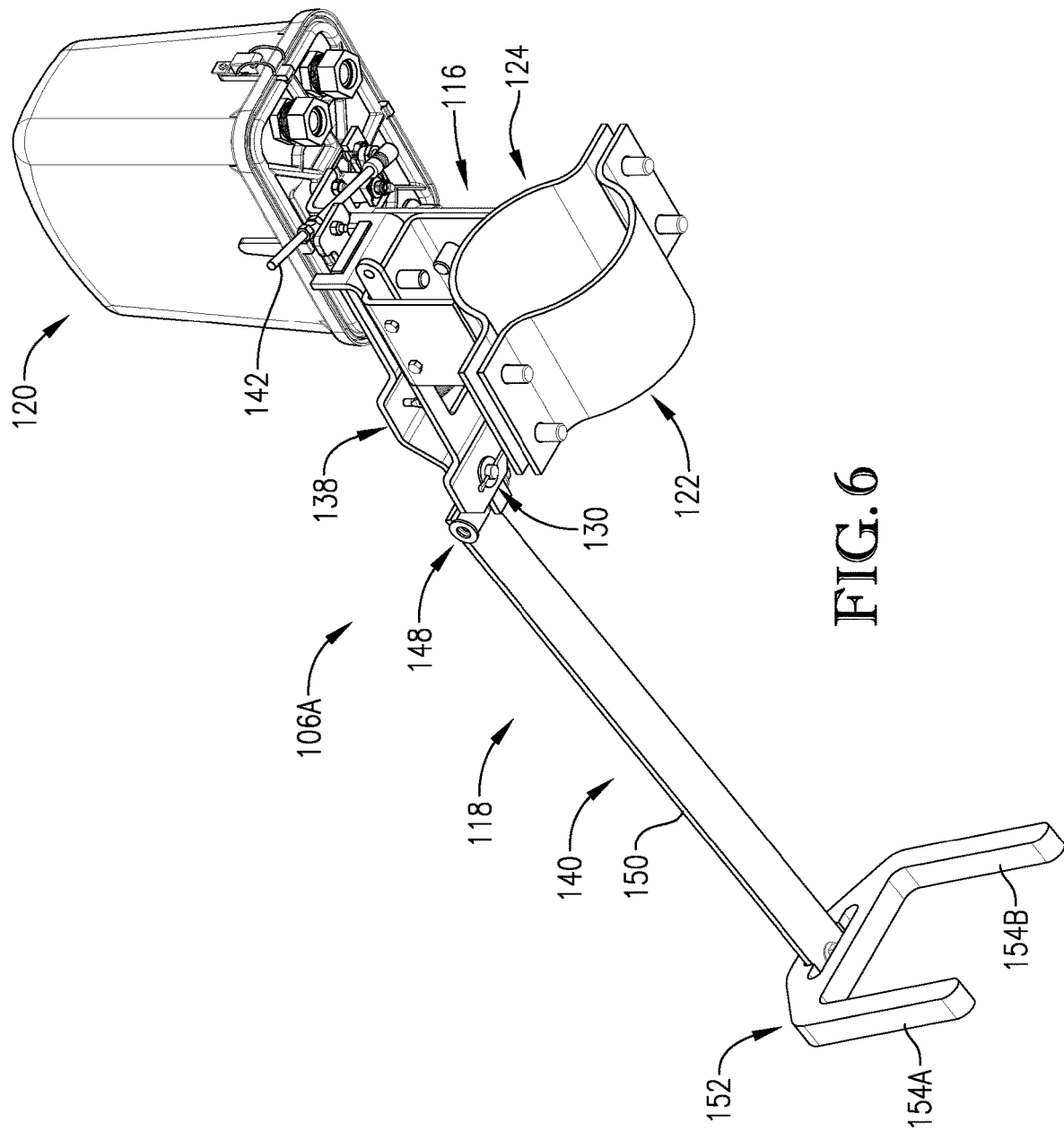
FIG. 6 is another bottom perspective view of the alignment system of FIG. 3.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. As used in the specification and in the claims, ordering words such as "first" and "second" are used to distinguish between similar components and do not imply specific components. Thus, the current technology can include a variety of combinations and/or integrations of the embodiments described herein.

Turning to FIGS. 1-6, a mobile irrigation system 100 in which alignment systems of the present invention may be incorporated is illustrated. The mobile irrigation system 100 is a central pivot irrigation system broadly comprising a central pivot 102, a plurality of spans 104A-D, and a plurality of alignment systems 106A-C. Other irrigation systems such as linear move irrigation systems may also be used without departing from the scope of the invention.

The central pivot 102 distributes water or other fluids to the spans 104A-D and may be a tower, a standpipe, or the like. The central pivot 102 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the first span 104A to the non-rotatable vertically extending pipe such that the spans 104A-D are free to pivot about the central pivot 102 while remaining connected thereto.

The plurality of spans 104A-D include a plurality of truss sections 108A-D, a plurality of conduit sections 110A-D, a plurality of mobile towers 112A-D, and a plurality of joints 114A-C. Any number of spans may be used without departing from the scope of the present invention. To that point, spans may be added and removed as an area to be irrigated is increased or decreased.

Each of the truss sections 108A-D provides rigidity to or otherwise supports one of the conduit sections 110A-D. The truss sections 108A-D may include braces, cross members, cables, and the like.

Each of the conduit sections 110A-D transport water or other fluids to a plurality of sprinklers, spray guns, drop nozzles, or other fluid emitting devices spaced along the conduit sections 110A-D to apply water and/or other fluids to areas underneath the irrigation system 100. The conduit sections 110A-D may be or may include metal pipes and flexible liners including outlets to which the fluid emitting devices are connected.

Each of the mobile towers 112A-D elevates adjacent truss sections 108A-D and may include an "A-frame" or similar structure for supporting an end of one of the truss sections 108A-D, a number of wheels connected to the A-frame for traversing across a field, and a motor for powering the wheels. Each mobile tower 112A-D may also include a controller for activating the motor according to a position of the mobile tower or a relative angle of the adjacent span 104A-D.

The joints 114A-C connect the spans 104A-D so that the spans are free to move relative to each other. In one embodiment, the joints 114A-C are integrated into the conduit sections 110A-D. Each of the joints 114A-C may be a ball joint, a swivel joint, a flexible joint, or any other suitable multi-axis joint. For best illustrating the benefits of the present invention, the joints 114A-C are described and illustrated as allowing three degrees of freedom between adjacent spans: lateral (horizontal) pivoting, vertical pivoting, and torsional rotation. It will be understood the terms horizontal and vertical are relative to general orientation of the irrigation system.

The alignment systems 106A-C determine and dictate lateral alignment between adjacent spans. The alignment systems 106A-C are substantially identical so only alignment system 106A will be described in detail. The alignment system 106A broadly comprises a base 116, a linkage system 118, and a control system 120.

The base 116 supports certain components of the linkage system 118 and the control system 120 and may include a lower mounting bracket 122, an upper mounting bracket 124, a linkage bracket 126, and a biasing element bracket 128. Alternatively, the base 116 may be omitted, in which case the linkage system 118 and/or the control system 120 may be mounted directly to one of the first and second spans 104A,B, or another component of the mobile irrigation system 100.

The lower mounting bracket 122 clamps the upper mounting bracket 124 to the conduit section 110A and may be U-shaped or C-shaped for at least partially encircling the conduit section 110A from below. The lower mounting bracket 122 may also include tabs or flanges having fastener mounting holes for securing the lower mounting bracket 122 to the upper mounting bracket 124 via fasteners.

The upper mounting bracket 124 clamps to the lower mounting bracket 122 and may be U-shaped or C-shaped for at least partially encircling the conduit section 110A from above. The upper mounting bracket 124 may also include tabs or flanges having fastener mounting holes for securing the upper mounting bracket 124 to the lower mounting bracket 122 via fasteners.

The linkage bracket 126 may include a first pivot point 130, a biasing element aperture 132, a slide bearing 134, and a stop 136. The linkage bracket 126 may be attached to the upper mounting bracket 124 via fasteners. Alternatively, the linkage bracket 126 may be part of the upper mounting bracket.

The first pivot point 130 connects a driven arm (described below) of the linkage system 118 to the linkage bracket 126 and may include a pin or other fastener. The first pivot point 130 may be configured to allow the driven arm to freely pivot relative to the linkage bracket 126 about a vertical axis. In one embodiment, the first pivot point 130 may be an ultra-high molecular-weight polyethylene (UHMWPE) bearing.

The biasing element aperture 132 may be sufficiently large for the biasing element 146 to extend through and have unimpeded lateral motion. The location and shape of the biasing element aperture 132 is dictated by the geometry, arrangement, and range of motion of the biasing element 146 and the driven arm, some of which may be limited by the stop 136.

The slide bearing 134 contacts the driven arm and ensures low friction lateral motion of the driven arm. In one embodiment, the slide bearing 134 may be a UHMWPE bearing.

The stop 136 restricts lateral range of motion of the driven arm. In one embodiment, the stop 136 includes opposing posts configured to engage the driven arm 138 if the driven arm is pivoted to a predetermined angle. This protects electromechanical components of the control system 120.

The biasing element bracket 128 anchors the biasing element 146 to the base 116. The biasing element bracket 128 may be adjustable for setting a desired tension and bias direction in the biasing element 146.

The linkage system 118 converts relative alignment between the first and second spans 104A,B into an input to electromechanical components of the control system 120 and broadly comprises a driven arm 138, a drive arm 140, a control arm 142, a control arm adjuster 144, and a biasing element 146. More generally speaking, the linkage system 118 is linked between the first and second spans 104A,B.

The driven arm 138 may be pivotably connected to the linkage bracket 126 at the first pivot point 130 and to the control arm 142 via the control arm adjuster 144. The driven arm 138 may also include a second pivot point 148 to which the drive arm 140 is pivotably connected. In one embodiment, the second pivot point 148 may be an ultra-high molecular-weight polyethylene (UHMWPE) bearing. Furthermore, the driven arm 138 may be linked to the biasing element 146 for reducing hysteresis in the linkage system 118 and hence improving accuracy of alignment measurements.

The drive arm 140 may be pivotably connected to the driven arm 138 at the second pivot point 148 so that the drive arm 140 can pivot relative to the driven arm 138 about a horizontal axis. The drive arm 140 may include a longitudinal section 150 having a distal end and an alignment guide 152 near the distal end.

The alignment guide 152 brackets (i.e., retains) the distal end of the drive arm 140 on the second span 104 without the drive arm 140 being fixed to the second span 104. In one embodiment, the alignment guide 152 may have an inverted U-shape and may include left and right downwardly-extending posts 154A,B configured to engage the second span 104. In other embodiments, the alignment guide 152 may encircle the second span 104. The alignment guide 152 may be monolithic or may be comprised of a plurality of connected components. The alignment guide 152 may also be made of UHMWPE for minimizing friction between the alignment guide 152 and the second span 104. Furthermore, the alignment guide 152 may be adjustably attached to the longitudinal section 150 of the drive arm 140 via an adjuster 156 for adjusting sensitivity of the linkage system 118.

The control arm 142 may be connected to the driven arm 138 via the control arm adjuster 144 and connected to (or configured to engage) electromechanical components of the control system 120. In one embodiment, the control arm 142 is pivotably connected to the driven arm 138 via the control arm adjuster 144.

The control arm adjuster 144 includes nuts, cams, or other components for setting the control arm's range of motion. This allows the alignment system 106 to be calibrated and also accommodates different sizes and configurations of brackets in the base 116, linkage components in the linkage system 118, electromechanical components of the control system 120, and truss components and conduit components in the first and second spans 104A,B.

The biasing element 146 connects between the driven arm of the linkage system 118 and the biasing element bracket 128 for reducing hysteresis in the linkage system 118 and hence improving accuracy of alignment measurements. The biasing element 146 may be a coil spring, a leaf spring, an elastic component, or any other suitable biasing element.

The control system 120 may be mounted on the base 116 and may include electromechanical components and electronic components for determining lateral alignment (i.e., making a lateral alignment determination) between the first and second spans 104A,B based on a position of the control arm 142 as governed by the drive arm 140 and the driven arm 138. For example, the control system 120 may include a cam, a microswitch, and a processor or controller.

In use, the alignment system 106 determines and dictates lateral alignment between the first and second spans 104A,B while not being negatively affected by torsional rotation or vertical pivoting between the first and second spans 104A,B. Specifically, the alignment guide 152 (and hence the drive arm 140) is retained in an upright orientation relative to the driven arm 138 regardless of torsional rotation between the first and second spans 104A,B. This prevents the torsional rotation from propagating through the linkage system 118 to the control system 120.

The drive arm 140 also pivots vertically relative to the driven arm 138 at the second pivot point 148. In this way, vertical pivoting between the first and second spans 104A,B is not propagated beyond the second pivot point 148.

On the other hand, lateral pivoting between the first and second spans 104A,B causes the drive arm 140 and driven arm 138 to pivot about the first pivot point 130. This motion propagates to the control arm 142, which engages electromechanical components of the control system 120. Importantly, because the torsional rotation between the first and second spans 104A,B is not propagated to the drive arm and the vertical pivoting between the first and second spans 104A,B is not propagated to the driven arm 138, the lateral alignment measurements of the control electromechanical components and electronic components of the control system 120 are not affected by the torsional rotation or the vertical pivoting between the first and second spans 104A,B.

The above-described invention provides several advantages. For example, the alignment system 106A is configured to track only lateral pivoting between the first and second spans 104A,B without detrimental effects from the torsional rotation or the vertical pivoting between the first and second spans 104A,B. The alignment guide 152 can be attached at one of a plurality of positions on the longitudinal section 150 of the drive arm 140, which allows for adjusting sensitivity of the linkage system 118. The control arm 142 can be adjusted relative to the drive arm 140 for calibrating the alignment system 106 and accommodating changes in the alignment system 106. The stop 136 protects the control system 120 from damage in the event of excessive lateral pivoting between the first and second spans 104A,B. Furthermore, the alignment system 106A can easily be adapted and retrofitted to virtually any mobile irrigation system.

Figure 7:
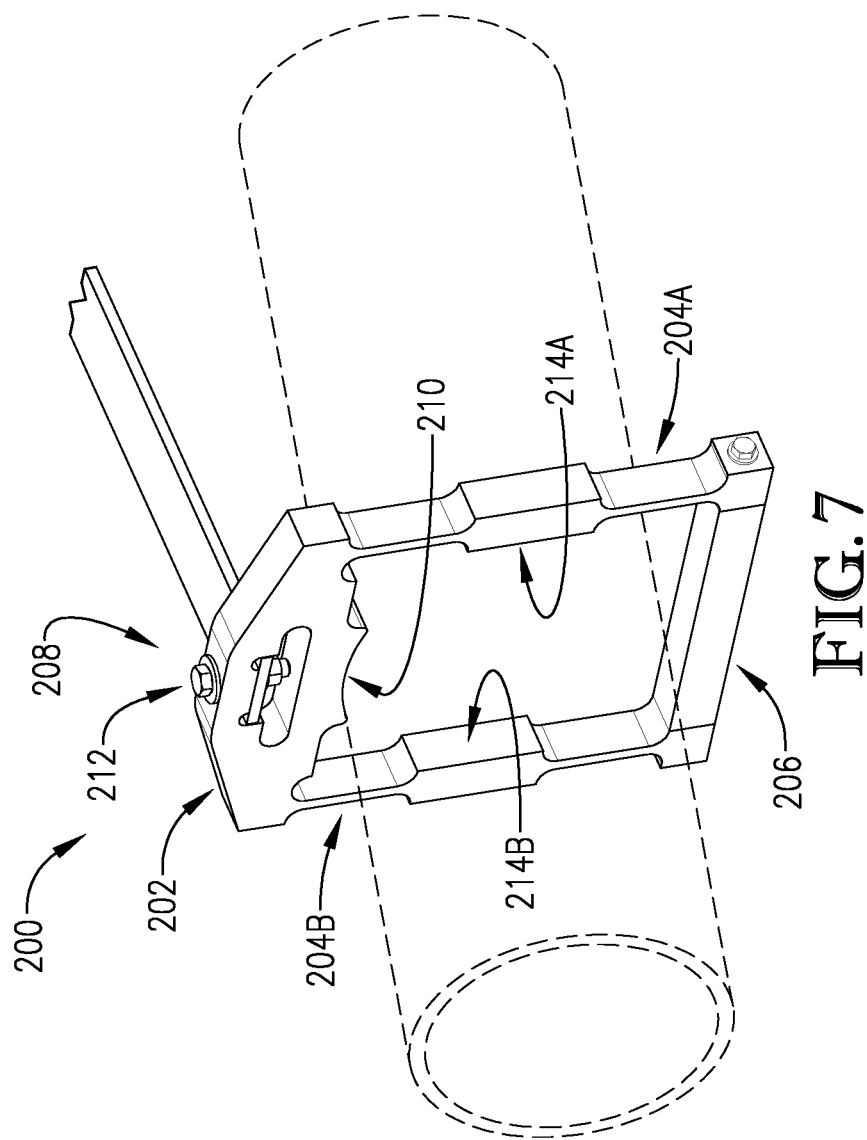
FIG. 7 is a perspective view of an alignment guide constructed in accordance with another embodiment of the invention.

Turning to FIG. 7, an alignment guide 200 constructed in accordance with another embodiment of the invention is illustrated. The alignment guide 200 broadly comprises an upper bar 202, left and right flexures 204A,B, and a lower bar 206.

The upper bar 202 may be configured to extend laterally over a conduit and may include a linkage connection point 208 and a slide bearing 210. The upper bar 202 and left and right flexures 204A,B may form a monolithic UHMWPE structure.

The linkage connection point 208 may be configured to connect the alignment guide 200 to a longitudinal section of a drive arm. To that end, the linkage connection point 208 may include an adjuster 212 for effectively changing a length of the longitudinal section of the drive arm and hence calibrating the alignment guide 200.

The slide bearing 210 may be a UHMWPE surface or other low friction surface configured to contact the conduit. The slide bearing 210 may also be curved to complement the curved surface of the conduit.

The left and right flexures 204A,B extend downward from opposite ends of the upper bar 202 to bracket the conduit and may each include a slide bearing (see slide bearings 214A and 214B). The left and right flexures 204A,B may be pre-loaded to bias the slide bearings 214A,B against the conduit.

The slide bearings 214A,B may be contact areas configured to slideably contact the conduit. The slide bearings 214A,B may be monolithic with a remainder of the left and right flexures 204A,B and upper bar 202.

The lower bar 206 may extend between distal ends of the left and right flexures 204A,B and may be secured to the left and right flexures 204A,B via opposing fasteners. The lower bar 206 is configured to retain the alignment guide 200 on the conduit.

The alignment guide 200 provides several advantages. For example, slide bearings 210 and 214A,B and left and right flexures 204A,B ensure the alignment guide 200 smoothly slides relative to the conduit while retaining alignment accuracy. The lower bar 206 also ensures the alignment guide 200 is retained on the conduit. The upper bar 202 and left and right flexures 204A,B being monolithic reduces part count.

Figure 8:
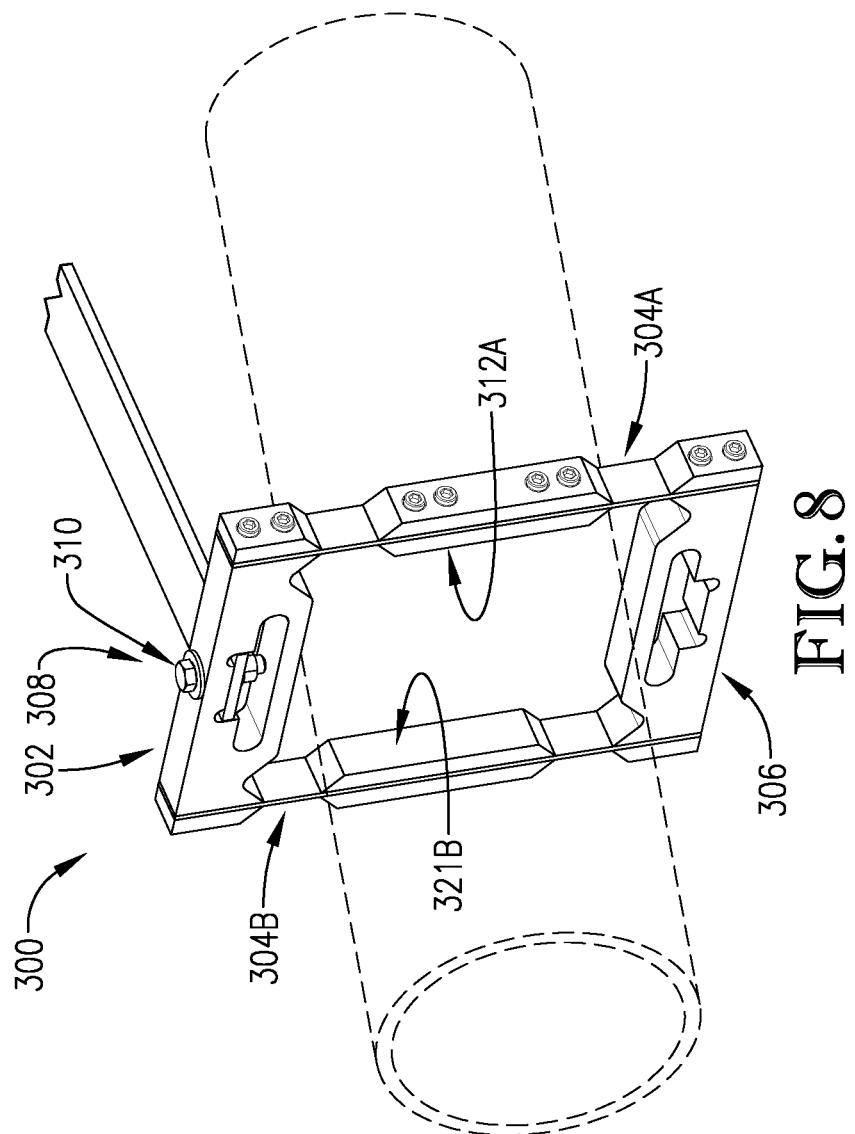
FIG. 8 is a perspective view of an alignment guide constructed in accordance with another embodiment of the invention.

Turning to FIG. 8, an alignment guide 300 constructed in accordance with another embodiment of the invention is illustrated. The alignment guide 300 broadly comprises an upper bar 302, left and right flexures 304A,B, and a lower bar 306.

The upper bar 302 may be configured to extend laterally over a conduit and may include a linkage connection point 308. The upper bar 302 may be connected to the left and right flexures 304A,B via fasteners.

The linkage connection point 308 may be configured to connect the alignment guide 300 to a longitudinal section of a drive arm. To that end, the linkage connection point 308 may include an adjuster 310 for effectively changing a length of the longitudinal section of the drive arm and hence calibrating the alignment guide 300.

The left and right flexures 304A,B extend downward from opposite ends of the upper bar 302 to bracket the conduit and may each include a slide bearing (see slide bearings 312A and 312B). The left and right flexures 304A,B may be connected to the upper bar 302 and the lower bar 306 via fasteners. The left and right flexures 304A,B may be pre-loaded to bias the slide bearings 312A, B against the conduit.

The slide bearings 312A, B may be contact pads configured to slideably contact the conduit. The slide bearings 312A, B may be connected to the left and right flexures 304A,B via fasteners.

The lower bar 306 may extend between distal ends of the left and right flexures 304A,B and may be secured to the left and right flexures 304A,B via opposing fasteners. The lower bar 306 is configured to retain the alignment guide 300 on the conduit. The upper bar 302 and lower bar 306 may be identical structures, which simplifies design and manufacturing.

The alignment guide 300 provides several advantages. For example, the slide bearings 312 and left and right flexures 304A,B ensure the alignment guide 300 smoothly slides relative to the conduit while retaining alignment accuracy. The slide bearings may also be adjustable for accommodating conduits of different sizes. The lower bar 306 also ensures the alignment guide 300 is retained on the conduit. The upper bar 302 and lower bar 306 may be identical structures, which simplifies design and manufacturing.

Turning to FIG. 9, an alignment guide 400 constructed in accordance with another embodiment of the invention is illustrated. The alignment guide 200 broadly comprises left and right arms 402A, B, a lower bar 404, and a biasing element 406.

The left and right arms 402A, B may extend diagonally downward relative to each other in an inverted V for cradling a conduit from above the conduit. A linkage connection point 408 may be present near an upper juncture of the left and right arms 402A,B for connecting the alignment guide 400 to a longitudinal section of a drive arm. To that point, the linkage connection point 408 may include an adjuster 410 for effectively changing a length of the longitudinal section of the drive arm and hence calibrating the alignment guide 400.

The lower bar 404 may be pivotably connected to one of the left and right arms 402A, B and may be configured to extend at least partially under the conduit. To that end, the lower bar 404 may be curved or may have an angled portion.

The biasing element 406 may be configured to connect the lower bar 406 to the opposite one of the left and right arms 402A,B to which the lower bar 404 is not pivotably connected. The biasing element 406 ensures the left and right arms 402A, B and lower bar 404 effectively encircle the conduit and the left and right arms 402A,B remain in cradling engagement with the conduit without creating a significant amount of friction therebetween. The biasing element 406 may be a spring, elastic cord, or the like. The alignment guide 400 may be disengaged from the conduit by removing or disconnecting the biasing element 406 from at least one of the biasing element 406 and the left or right arm 402A, B to which it is attached.

The alignment guide 400 provides several advantages. For example, the alignment guide 400 simplifies assembly on the conduit. The alignment guide 400 also automatically works on conduits of virtually any size without the need for adjustment. The biasing element 406 ensures the left and right arms 402A,B and lower bar 404 create minimal friction with the conduit while retaining alignment accuracy.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An alignment system for a mobile irrigation system including first and second spans, the alignment system comprising:
   a bracket configured to be directly or indirectly connected to the first span;

a driven arm connected to the bracket at a pivot point and configured to pivot relative to the bracket about a vertically extending axis at the pivot point;

a drive arm including a distal end and being connected to the driven arm so the driven arm pivots with the drive arm about the vertically extending axis, wherein the driven arm extends from the pivot point opposite the drive arm; and an alignment guide near the distal end, the alignment guide comprising:
   a connection point configured to attach the alignment guide on the drive arm; and
   opposing left and right members configured to bracket the alignment guide on the second span so that the drive arm and hence the driven arm pivot about the vertically extending axis according to lateral movement of the second span relative to the first span,
   the alignment guide being configured to be adjustably attached at one of a plurality of positions along a longitudinal axis of the drive arm thereby adjusting sensitivity of the alignment system.

2. The alignment guide of claim 1, the opposing left and right members being left and right rigid posts.

3. The alignment guide of claim 1, the opposing left and right members being flexures configured to be preloaded against the second span.

4. The alignment guide of claim 3, the alignment guide further comprising a horizontal bar having opposing ends, the flexures extending down from the opposing ends of the horizontal bar, the flexures and horizontal bar being monolithic.

5. The alignment guide of claim 3, the flexures being resilient aluminum strips.

6. The alignment guide of claim 1, the alignment guide having an inverted U-shape.

7. The alignment guide of claim 1, the alignment guide further comprising an upper bar extending between the opposing first and second members and a lower bar extending between the first and second members opposite the upper bar, the upper bar and lower bar being identical components.

8. The alignment guide of claim 1, the opposing left and right members forming an upper inverted V-shaped fork, the alignment guide further comprising a lower link pivotably connected to the first member and a biasing element connecting the lower link to the second member so that the alignment guide is configured to encircle the second span.

9. The alignment guide of claim 1, the alignment guide being at least partially formed of ultra-high molecular-weight polyethylene (UHMWPE) for minimizing friction between the alignment guide and the second span.

10. The alignment system of claim 1, further comprising a biasing element connected to the driven arm for reducing hysteresis in the alignment system.

11. The alignment system of claim 1, the drive arm further being configured to pivot relative to the driven arm about a horizontally extending axis at an additional pivot point.

12. An alignment system for a mobile irrigation system including first and second spans, the alignment system comprising:
   a driven arm configured to pivot relative to the first span about a vertically extending axis at a pivot point;
   a drive arm including a distal end and being connected to the driven arm so the driven arm pivots with the drive arm about the vertically extending axis;
   an alignment guide near the distal end, the alignment guide comprising:
      a connection point configured to attach the alignment guide on the drive arm; and
      opposing left and right members configured to bracket the alignment guide on the second span so that the drive arm and hence the driven arm pivot about the vertically extending axis according to lateral movement of the second span relative to the first span,
      the alignment guide being configured to be adjustably attached at one of a plurality of positions along a longitudinal axis of the drive arm thereby adjusting sensitivity of the alignment system;
   a control arm drivably linked to the driven arm; and
   a control arm adjuster configured to be adjustably attached at one of a plurality of positions along a longitudinal axis of the control arm thereby changing a range of motion of the control arm.

13. The alignment system of claim 12, the opposing left and right members being left and right rigid posts.

14. The alignment system of claim 12, the opposing left and right members being flexures configured to be preloaded against the second span.

15. The alignment system of claim 14, the alignment guide further comprising a horizontal bar having opposing ends, the flexures extending down from the opposing ends of the horizontal bar, the flexures and horizontal bar being monolithic.

16. The alignment system of claim 14, the flexures being resilient aluminum strips.

17. The alignment system of claim 12, the alignment guide having an inverted U-shape.

18. The alignment system of claim 12, the alignment guide further comprising an upper bar extending between the opposing first and second members and a lower bar extending between the first and second members opposite the upper bar, the upper bar and lower bar being identical components.

19. The alignment system of claim 12, the opposing left and right members forming an upper inverted V-shaped fork, the alignment guide further comprising a lower link pivotably connected to the first member and a biasing element connecting the lower link to the second member so that the alignment guide is configured to encircle the second span.

20. The alignment system of claim 12, the alignment guide being configured to be adjustably attached at one of a plurality of positions along a longitudinal axis of the drive arm for adjusting sensitivity of the alignment system.

21. The alignment system of claim 12, further comprising a biasing element connected to the driven arm for reducing hysteresis in the alignment system.

22. The alignment system of claim 12, the drive arm further being configured to pivot relative to the driven arm about a horizontally extending axis at an additional pivot point.

* * * * *